United States Patent Office 3,370,961
Patented Feb. 27, 1968

3,370,961
FUDGE-MAKING PROCESS
Thedosius N. Peterson, Wilmington, Del., assignor, by mesne assignments, to Thomas B. Baker
No Drawing. Filed Apr. 21, 1965, Ser. No. 449,859
9 Claims. (Cl. 99—134)

ABSTRACT OF THE DISCLOSURE

A method of making a fudge confectionary by the steps of:

(1) Heating 40% to 70% of the sugar required to a temperature of 230° F. to 240° F.;
(2) Cooling the resulting mix without agitation to a temperature of 130° F. to 180° F. at a rate of at least about 5° F. per minute;
(3) Adding a fondant containing the remaining 60% to 30% of the sugar;
(4) Creaming the mixture at a temperature of about 100° F. to 140° F., and;
(5) Spreading the product to allow it to cool and harden.

The method is adaptable to conventional fudge recipes. Flavoring ingredients and the like may be added to either the initial mix or the fondant.

This invention relates to an improved process for making fudge or similar confectionary product.

The production of fudge of superior quality is a difficult art, requiring careful control of the cooking and cooling cycles involved in the production. Although a number of dry mixes are commercially available, which enable the housewife to produce acceptable fudge in her own kitchen by merely adding water and cooking the resulting mixture to a uniform consistency, such methods do not consistently produce a fudge of superior quality; and, hence, are not suitable for the commercial production of fudge, which must consistently deliver a superior fudge product in order to be attractive to the consumer.

Commercial fudges are generally prepared by mixing milk, corn syrup (glucose), sugar, fat, a little salt, and suitable flavoring matter such as chocolate; cooking the resulting mixture to a temperature of about 235° F. to 245° F., while agitating the mix; cooling the mix to a temperature between 90° F. and 120° F.; "creaming" the mixture by agitating it; and then spreading it out in trays to set the fudge. Other methods involve spreading the cooked mix on a cooling slab and creaming it while on the slab.

The initial cooking, cooling and creaming steps must be particularly carefully controlled if a superior fudge is to be obtained and it usually requires an expert to consistently achieve a superior product. The principal cause for the necessity of careful control is the requirement to obtain a fine smooth grained body and overcome the natural tendency of the sugar in the fudge to crystallize into coarse particles and the tendency of the fudge to become hard and brittle, rather than soft and yet firm. Thus, if cooked to too high a temperature, the fudge will be too hard and if not cooked to a sufficiently high enough temperature, the fudge will be too moist and runny. If the fudge is creamed while too hot, or creamed for too long a period, the grain of the resulting fudge will be too coarse.

It is, therefore, an object of the present invention to provide a method for making fudge which will result in a fudge of fine grain size and a smooth texture.

It is another object of this invention to provide a method for making fudge of consistently superior quality which is less dependent on the skill of the operator than methods heretofore employed.

Still another object of this invention is to provide a fudge-making process which can employ a prefabricated dry mix.

Other objects will become apparent hereinafter.

In accordance with the present invention, a fudge type confectionery product is prepared by a process which comprises mixing the non-flavoring ingredients of said confectionery product containing from 40% to 70% of the sugar required for said product and uniformly heating such mixture to a temperature of 230° F. to 240° F., cooling the resulting mix to a temperature of 130° F. to 180° F. at a rate sufficiently rapid to prevent substantial crystallization without agitation, adding a fondant kept at room temperature and containing from 60% to 30% of the sugar required for said product, creaming the mixture at a temperature of 100° F. to 140° F. and thereafter spreading the resulting product and cooling it to substantially room temperature. The uniform heating required in the process of the present invention is generally accomplished by agitating the mixture. The principal non-flavoring ingredients employed in the making of fudge and fudge-like products are sugar, i.e., sucrose, corn syrup, i.e., glucose, at least one edible fatty material, a milk product, and water. Any edible fatty acid glyceride which does not boil or decompose at the cooking temperature is suitable. Examples of suitable fatty acid glyceride include butter, lard, hydrogenated vegetable oils, margarine, and the like. By milk product is meant the solid constituents of milk after removal of water. Instead of using milk products and water, it is, of course, feasible to employ milk or cream as such. The aforesaid description of the method of the present invention does not specify flavoring ingredients in the initial mix, such as vanilla, chocolate and the like; it is, however, to be understood that such flavoring ingredients can be added during any stage of the described method calling for agitation.

Although some of the conditions in the foregoing description of the method for the preparation of fudge and fudge-like products are set forth in terms of ranges, such conditions are critical and the ranges result from the ability to adjust the interrelated process steps. However, the mere variation of a single condition may result in a fudge of unacceptable commercial quality. Thus, although the cooking temperature may vary within the range indicated, once the remaining process conditions have been fixed, the selected temperature must be achieved within ±0.5° F. The mix cannot be heated to less than 0.5° F. of the selected temperature nor to more than 0.5° F. above the selected temperature. In view of the close temperature tolerances, atmospheric pressure variations must be taken into consideration. The agitation provided during the heating cycle should be such as to maintain a uniform temperature throughout the mix as the mix approaches the critical temperature.

After the mix has reached the desired temperature, agitation is stopped and the mix cooled at a rate rapid enough to prevent crystallization of the sugar in the mix. This is necessary in order to control the crystal size in the final product, to prevent the formation of coarse crystals and give the fudge a smooth, firm texture. Such cooling generally requires artificial cooling means such as water cooling or forced air cooling since allowing the mix to cool without forced cooling means will result in substantial crystallization of the sugar which must be avoided. Whether a particular means or method of cooling results in sufficiently rapid cooling to prevent substantial crystallization of the mix is readily determined experimentally by examination of the cooled mix. Generally, cooling rates of higher than about 5° F. per minute will prevent undesirable crystallization.

To the cooled mix is then added fondant, a mixture of sugar, i.e., sucrose, and corn syrup, i.e., glucose, which contains the sugar in finely divided crystalline form. The preparation of such fondants if well known in the art, such as U.S. Patent 2,106,762, and thus need not be further detailed here. The quantity of fondant added which acts in part as a crystal seed for the mix is also critical in order to achieve the desired crystal structure in the final product. Again, this quantity of crystal sugar, if varied, require corresponding adjustments in the other steps of the process. Taking the range of conditions for these other steps into consideration, the quantity of the crystallized sugar in the fondant constitutes from 30 to 60 weight percent of the total sugar content of the fudge. At the same time that the fondant is added, flavoring agents are added although such is not essential since the flavoring agents can be added to the original mix.

On addition of the fondant and the flavoring agents, the mixture is creamed, i.e., blended to form a uniform homogeneous mass, during which the final desired crystallization of the sugar occurs. As a result of the addition of the fondant, the temperature of the mix is within the range of 100° F. to 140° F. during the creaming cycle. If desired, cooling can be continued during the addition and blending of the fondant. The duration of the creaming cycle will differ depending on the recipe and the flavoring agents involved. Generally, the creaming cycle will vary from two to four minutes and is accomplished when the added ingredients are uniformly distributed in the mix.

Upon completion of the creaming cycle, the fudge is poured out into trays and allowed to cool to room temperature.

The exact composition of fudge prepared in accordance with the method of the present invention can differ widely and many recipes for making fudges are known to those skilled in the art. Most of the recipes call for mixing all ingredients simultaneously. It is only necessary, in order to adapt such recipes to the method of the present invention, to withhold from the original recipe from 30 to 60 percent of the total sugar employed and add such after the cooling cycle in the form of a fondant as above indicated.

The present invention is further illustrated by the following examples in which, unless otherwise indicated, all quantities are by weight.

*Example I*

This example illustrates the use of a liquid mix to prepare fudge.

Into a copper kettle is charged:

| | |
|---|---|
| Corn syrup, lbs. | 1.5 |
| Sugar, lbs. | 4 |
| Heavy cream (40%), qt. | 1 |
| Hydrogenated vegetable oil, lbs. | 0.5 |
| Salt, ounce | 1 |

The resulting mixture is cooked while agitated at 32 r.p.m. to a temperature of 240° F.±0.5° F. at sea level atmospheric pressure. The agitator is stopped when the temperature is reached and the mixture cooled at a rate of 10° F. per minute to a temperature of 160° F. When the desired temperature is reached, 4 pounds of fondant, comprising 8 parts of sugar and 2 parts of corn syrup is added to the mix together with 1 ounce of vanilla and 1 pound of nuts and the resulting mix is agitated for a period of two minutes until a uniform mixture is obtained. The resulting fudge is then poured into trays and allowed to cool to room temperature. A fine-textured, smooth and yet firm fudge is obtained.

*Example II*

This example illustrates the use of a dry mix to prepare fudge.

Into a copper kettle is charged a dry mixture comprising:

| | |
|---|---|
| Dried corn syrup, lb. | 1 |
| Dried whole milk, lb. | 0.5 |
| Sugar, lbs. | 4 |
| Flaked hydrogenated vegetable oil, lb. | 0.5 |
| Salt, ounce | 1 |

To this mixture is then added:

| | |
|---|---|
| Water, pint | 1 |
| Butter flavor, ounce | 1 |
| Vanilla, ounce | 1 |

The resulting mixture is cooked while agitated at 32 r.p.m. to a temperature of 240° F.±0.5° F. at sea level atmospheric pressure. The agitator is stopped when the temperature is reached and the mixture cooled at a rate of 10° F. per minute to a temperature of 180° C. When the desired temperature is reached, 4 pounds of fondant, comprising 8 parts of sugar and 2 parts of corn syrup is added to the mix. The resulting mix is agitated for a period of two minutes until a uniform mixture is obtained and is then poured out into trays and allowed to cool to room temperature. A fine-textured, smooth and firm fudge is obtained.

The foregoing examples have illustrated the method of the present invention. Various modifications particularly in the composition of the fudge will be apparent to those skilled in the art. Instead of the milk product, such as dried milk, it is possible to employ butter or margarine and similar fatty materials. The particular ingredients employed in the foregoing examples may be varied by as much as 10 percent either way and still result in a superior fudge product. Although the present invention has been described with particular emphasis on the making of fudge, it is to be understood that the same process can also be employed for the production of related confectionery products such as peanut brittle, pralines, and the like.

While the invention has been described in connection with specific embodiments thereof, it will be understood that is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinabove set forth, and as fall within the scope of the invention or the limits of the appended claims.

What is claimed is:

1. A method of making a fudge type confectionery product which comprises mixing the nonflavoring ingredients of said confectionery product containing from 40% to 70% of the sugar required for said product and uniformly heating such mixture to a temperature of 230° F. to 240° F., cooling the resulting mix to a temperature of 130° F. to 180° F. at a rate of at least 5° F. per minute without agitation thereafter adding a fondant containing from 60% to 30% of the sugar required for said product, creaming the mixture at a temperature of 100° F. to 140° F. and thereafter spreading the resulting product and cooling it to substantially room temperature.

2. The method of claim 1 wherein the flavoring is added with the initial ingredients.

3. The method of claim 1 wherein the flavoring is added with the fondant.

4. The method of claim 1 wherein the initial mix comprises sugar, corn syrup at least one fatty material and water.

5. The method of making fudge which comprises heating a mixture of sugar in the form of sucrose, corn syrup, an edible fatty material, a milk product and water, said sucrose constituting from 40% to 70% of the total sugar content of said fudge to within 0.5° F. of a temperature within the range of 230° F. to 240° F. while agitating the mixture, cooling the resulting mix to a temperature of 130° F. to 180° F. at a rate of at least 5° F. per minute without agitation, thereafter adding a fondant containing from 60% to 30% of the sugar required for said product, creaming the mixture at a temperature of 100° F. to 140° F. until a uniform mixture is obtained and thereafter spreading the resulting product and cooling it to substantially room temperature.

6. The method of claim 5 wherein the initial mixture is heated to a temperature of 240° F.±0.5° F.

7. The method of claim 5 wherein the milk product and the water are combined in the form of milk.

8. The method of claim 5 wherein flavoring is added to the fudge with the fondant.

9. The method of claim 5 wherein the creaming is carried on for a period of two to four minutes.

References Cited

Richmond, Walter L.: Candy Production: Methods and Formulas, The Manufacturing Confectioner, Chicago, Ill., 1948, pp. 263–264.

A. LOUIS MONACELL, *Primary Examiner.*

S. E. HEYMAN, *Assistant Examiner.*